United States Patent
Cheng

(10) Patent No.: US 7,894,954 B2
(45) Date of Patent: Feb. 22, 2011

(54) POWER CONTROL SYSTEM FOR CAR COMPUTER

(75) Inventor: Ta-Yang Cheng, Taipei (TW)

(73) Assignee: King Young Technology Co., Ltd., Taipei (TW)

(*) Notice: Subject to any disclaimer, the term of this patent is extended or adjusted under 35 U.S.C. 154(b) by 932 days.

(21) Appl. No.: 11/757,537

(22) Filed: Jun. 4, 2007

(65) Prior Publication Data
US 2008/0301481 A1    Dec. 4, 2008

(51) Int. Cl.
G06F 7/00    (2006.01)
(52) U.S. Cl. .............................. 701/36; 307/64; 307/66; 322/11; 713/323
(58) Field of Classification Search .................... 701/36; 713/323–324, 399, 340; 307/64, 66; 322/11
See application file for complete search history.

(56) References Cited

U.S. PATENT DOCUMENTS

| | | | |
|---|---|---|---|
| 5,198,698 A * | 3/1993 | Paul et al. ................... | 307/64 |
| 5,332,927 A * | 7/1994 | Paul et al. ................... | 307/66 |
| 5,888,213 A * | 3/1999 | Sears et al. .................. | 623/24 |
| 2004/0199308 A1* | 10/2004 | Hasfjord et al. ............ | 701/36 |
| 2005/0222725 A1* | 10/2005 | Homma et al. ............. | 701/36 |
| 2006/0247835 A1* | 11/2006 | Nagata ........................ | 701/36 |
| 2007/0135981 A1* | 6/2007 | Raichle et al. ............. | 701/36 |
| 2008/0033610 A1* | 2/2008 | Engel ........................... | 701/36 |
| 2008/0301481 A1* | 12/2008 | Cheng ......................... | 713/323 |
| 2009/0259363 A1* | 10/2009 | Li et al. ....................... | 701/36 |

(Continued)

FOREIGN PATENT DOCUMENTS

EP    1083475 A1 *  3/2001

(Continued)

OTHER PUBLICATIONS

Providing Quadratic Convergence of Decentralized Power Control in Wireless Networks-The Method of Min-Max Functions Wiczanowski, M.; Stanczak, S.; Boche, H.; Signal Processing, IEEE Transactions on; vol. 56 , Issue: 8 , Part: 2; Digital Object Identifier: 10.1109/TSP.2008.925925; Publication Year: 2008 , pp. 4053-4068.*

(Continued)

*Primary Examiner*—Cuong H Nguyen
(74) *Attorney, Agent, or Firm*—Apex Juris, pllc; Tracy M Heims

(57) ABSTRACT

A power control system for car computer includes a power switching circuit located between a power input terminal of a computer host and an external power source, such that the computer host outputs a keep-power-on signal when a key power is supplied thereto; a power ON/OFF circuit receiving the keep-power-on signal to thereby connect the external power source to the computer host; a key power detection circuit for constantly detecting whether the key power is ON, so that the computer host outputs a shut-down signal when the key power is OFF; a computer shut-down circuit for receiving the shut-down signal from the computer host and thereby driving the computer host to execute shut-down procedures; and a power OFF circuit for sensing an OFF state of the key power and outputting a control signal to drive the power ON/OFF circuit to disconnect the external power source from the computer host.

6 Claims, 1 Drawing Sheet

U.S. PATENT DOCUMENTS

| | | | | |
|---|---|---|---|---|
| 2009/0312903 A1* | 12/2009 | Hafner et al. | ............... | 701/36 |
| 2010/0141431 A1* | 6/2010 | Boss et al. | ............ | 340/539.13 |
| 2010/0268417 A1* | 10/2010 | Martin et al. | ............... | 701/36 |

FOREIGN PATENT DOCUMENTS

| | | | | |
|---|---|---|---|---|
| JP | 58016939 | A | * | 1/1983 |
| JP | 63298418 | A | * | 12/1988 |
| JP | 2005-130416 | | * | 4/2005 |
| JP | 2008186152 | A | * | 8/2008 |
| JP | 2010033773 | A | * | 2/2010 |
| WO | WO 2008136738 | A1 | * | 11/2008 |

OTHER PUBLICATIONS

Compensation of control delay and discrete control error in predictive direct power control for three-level PWM rectifier; Lu, T.; Zhao et al.; Power Electronics for Distributed Generation Systems (PEDG), 2010 2nd IEEE International Symposium on; Digital Object Identifier: 10.1109/PEDG.2010.5545772; Pub. Year: 2010 , pp. 829-834.*

Joint signal-level and C/I-based power control for TDMA mobile radio systems; Zanella, A.; Electronics Letters; vol. 37 , Issue: 20; Digital Object Identifier: 10.1049/el:20010843; Publication Year: 2001 , pp. 1257-1258.*

Soft Sensing and Optimal Power Control for Cognitive Radio; Srinivasa, S.; Jafar, S.A.; Global Telecommunications Conference, 2007. GLOBECOM '07. IEEE; Digital Object Identifier: 10.1109/GLOCOM.2007.265; Publication Year: 2007 , pp. 1380-1384.*

A simple iterative power control scheme for successive interference cancellation; Andrews, J.; Agrawal, A.; Meng, T.; Cioffi, J.; Spread Spectrum Techniques and Applications, 2002 IEEE Seventh International Symposium on; vol. 3; Digital Object Identifier: 10.1109/ISSSTA.2002.1049362; Publication Year: 2002 , pp. 761-765 vol. 3.*

An advanced darlington transistor for switch mode power control; Colman, Derek; Radio and Electronic Engineer vol. 54 , Issue: 5; Digital Object Identifier: 10.1049/ree.1984.0054; Publication Year: 1984 , pp. 219-224.*

Generalised Multi-Receiver Radio Network: Capacity and Asymptotic Stability of Power Control through Banach's Fixed-Point Theorem; Rodriguez, V.; Mathar, R.; Schmeink, A.; Wireless Communications and Networking Conference, 2009. WCNC 2009. IEEE; Digital Object Identifier: 10.1109/WCNC.2009.4917736; Publication Year: 2009 , pp. 1-6.*

A Multi-Microcomputer Based Distributed Front End Communications Subsystem for a Power Control Center; Woods, D. E.; Serafin, R. D.; Power Engineering Review, IEEE; vol. PER-2 , Issue: 1; Digital Object Identifier: 10.1109/MPER.1982.5519689; Publication Year: 1982 , pp. 32-32.*

Miller Electric Mfg. Co. advertising brochure for Trailblazer 250G-250 Ampere MultiProcess Gasoline Engine Driven Welding Generator, Aug. 1989.*

Miller Electric Mfg. Co. advertising brochure for Big 30A Diesel-300 Ampere Diesel Engine Driven Welding Generator, May 1990.*

Miller Electric Mfg. Co. advertising brochure for Big 40G-400 Ampere Gasoline.*

Miller Electric Mfg. Co. Owner's Manual for Model: Blue Charger, Form OM-429A, Sep. 1990.*

* cited by examiner

POWER CONTROL SYSTEM FOR CAR COMPUTER

FIELD OF THE INVENTION

The present invention relates to a power control system for car computer, and more particularly, to a control system for automatically controlling the power supply to a car computer depending on the ON or OFF state of a car power.

BACKGROUND OF THE INVENTION

A car has become an indispensable traffic means among people living in the modern society. Various types of in-car audio/visual (AV) devices have been constantly developed and introduced into the market to satisfy most consumers' requirement for comfortable life. Meanwhile, computers have also become indispensable among people in their work and interaction with others. In response to different requirements in different occasions, differently configured computers have been widely developed. Among others, a computer for mounting and using in a car and adapted to combine with other in-car AV devices has drawn the attention of related manufacturers and dealers.

However, the car computer is subjected to the following limits in its applications:
1. The car computer has a supply voltage different from that of the general portable computers. This voltage problem can be overcome through electronic circuit designs.
2. Special care must be taken to maintain and control the power supply to the car computer. To prevent the continuously operating car computer from consuming the battery power of the car and accordingly, adversely affecting the normal operation of the car, the car computer must be set to be turned on only when the car power source is ON, i.e., when the car has been started, and to automatically close the operating system when the car power source is OFF. However, the currently available Windows does not allow a user to shut down a computer by arbitrarily powering off the computer. Therefore, it is an important issue for a car computer to automatically control the power supply thereof to ON or OFF according to the on or off of the car power source.

It is therefore tried by the inventor to develop a power control system for car computer, so as to overcome the past limits to the application of a car computer.

SUMMARY OF THE INVENTION

A primary object of the present invention is to provide a power control system for car computer, so that a car computer may automatically and effectively control the power supply thereof to ON or OFF according to the on or off of a car power source.

To achieve the above and other objects, the power control system for car computer according to the present invention includes a computer host; a power switching circuit located between a power input terminal of the computer host and an external power source, such that when a key power is ON and supplied to the computer host, the computer host outputs a keep-power-on signal; a power ON/OFF circuit located between the power switching circuit and the external power source for receiving the keep-power-on signal from the computer host to thereby connect the external power source to the power input terminal of the computer host; a key power detection circuit for detecting from time to time whether the key power is ON, and outputting a detected result to the computer host, so that the computer host may output a shut-down signal when the key power is detected as OFF; a computer shut-down circuit for receiving the shut-down signal from the computer host and thereby driving the computer host to execute shut-down procedures; and a power OFF circuit for sensing an OFF state of the key power, and outputting a control signal to drive the power ON/OFF circuit to disconnect the external power source from the computer host.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
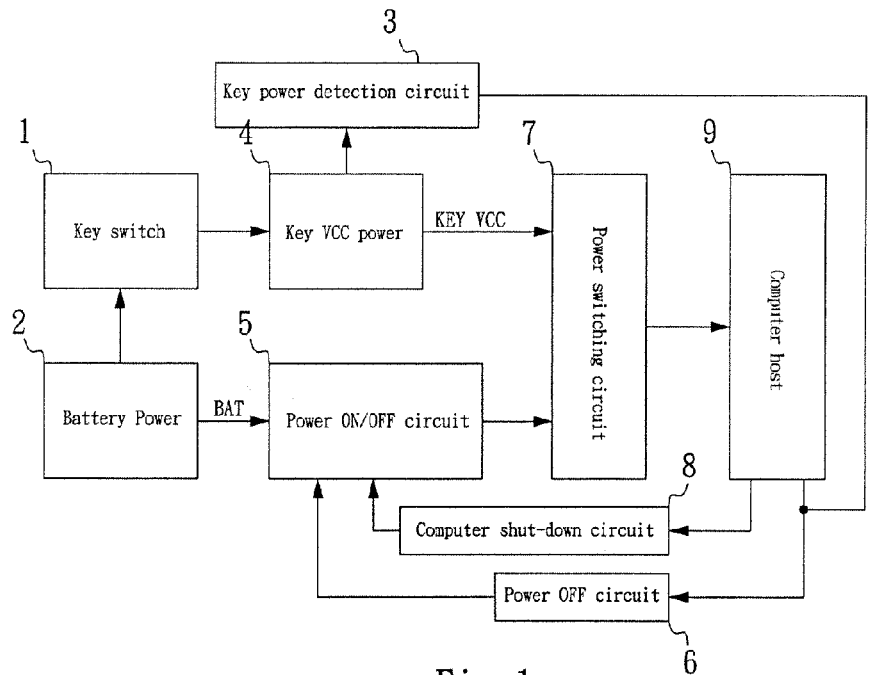
FIG. 1 is a block diagram of a power control system for car computer according to an operable embodiment of the present invention.
Figure 2:
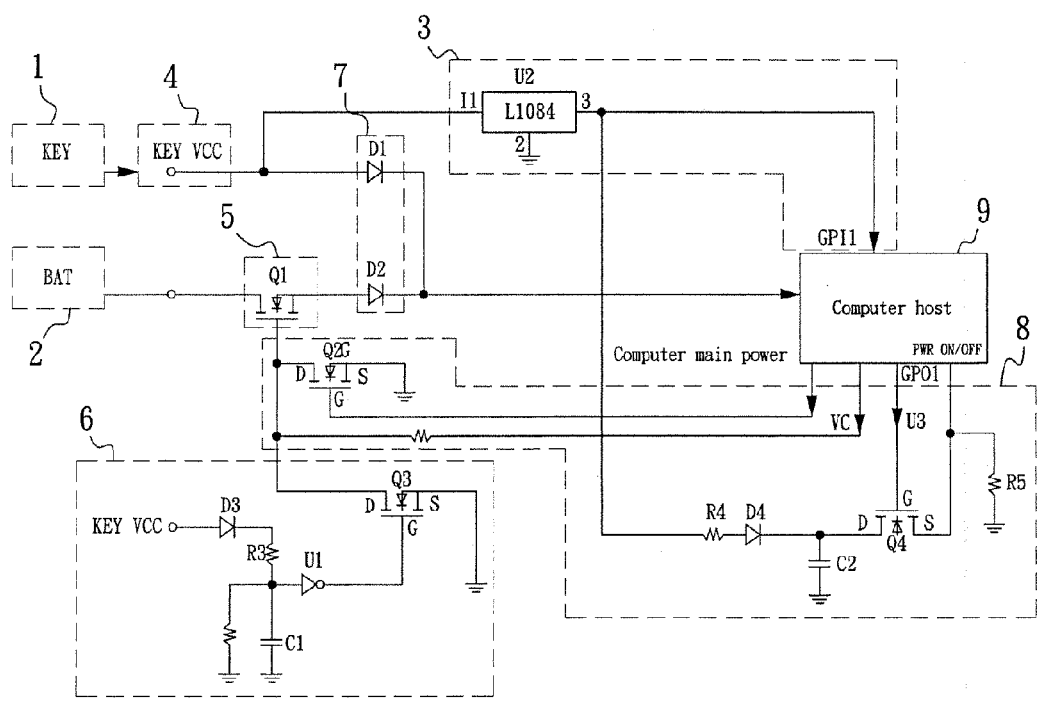
FIG. 2 is a circuit diagram of a power control system for car computer according to an operable embodiment of the present invention.

Please refer to FIGS. 1 and 2 that are block and circuit diagrams, respectively, of a power control system for car computer according to an operable embodiment of the present invention. As shown, the present invention includes a key power detection circuit 3, a power ON/OFF circuit 5, a power OFF circuit 6, a power switching circuit 7, a computer shut-down circuit 8, and a computer host 9.

The power switching circuit 7 is located before a power input terminal of the computer host 9, and is forward connected to a key power 4 via a diode D1, and forward connected to the power ON/OFF circuit 5 via another diode D2, which is connected to the diode D1 in parallel.

The power ON/OFF circuit 5 is a transistor switch Q1 connected to a car battery power source 2 or an external power source.

The key power detection circuit 3 is an integrated circuit U2. When the key power 4 is ON, the key power detection circuit 3 outputs a driving signal to a pin GPI1 of the computer host 9.

In the computer shut-down circuit 8, a first transistor switch Q4, which is a metal field effect transistor (MFET), is connected at a Gate to a pin GPO1 of the computer host 9, at a Source to a power ON/OFF of the computer host 9, and at a Drain to a capacitor C2 for grounding. The first transistor switch Q4 is also connected via a resistor R4 and a diode D4 to an output of the integrated circuit U2 of the key power detection circuit 3. In addition, the computer shut-down circuit 8 also includes a second transistor switch Q2 connected between the power ON/OFF circuit 5 and the computer host 9.

The power OFF circuit 6 includes a diode D3 connected to the key power 4. The diode D3 is connected via a resistor R3 to a grounding capacitor C1 and an inverter U1, and the inverter U1 is connected via a transistor switch Q3 to the second transistor switch Q2 and the transistor switch Q1.

When the key power 4 is turned on via a key switch 1, electric current is supplied to the computer host 9 via the diode D1 of the power switching circuit 7, and the transistor switch Q1 of the power ON/OFF circuit 5 is turned on via a pin VC of the computer host 9, so that the battery power source 2 or the external power source is electrically connected to the computer host 9 via the diode D2 to form a power supply to the computer host 9. At this point, the key power detection circuit 3 detects from time to time whether the key power 4 is ON. Once the key switch 1 is operated to turn off the key power 4, the pin GPI1 of the computer host 9 has a low potential LO input, and the pin GPO1 of the computer host 9 outputs a potential HI, driving the first transistor switch Q4 to turn on the capacitor C2 and the power ON/OFF of the computer host 9, so as to utilize a voltage of the capacitor C2 to drive and maintain power supply for the computer host 9 to shut down the operating system. Meanwhile, the key power 4 in the OFF state would cause the capacitor C1 of the power OFF circuit 6 to discharge. When the capacitor C1 has a voltage at low potential LO, the inverter U1 may turn on the transistor switch Q3 and further turns off the transistor switch Q1, so as to disconnect the computer host 9 from the battery power source 2 or the external power source.

With the above arrangements, the power control system for car computer according to the present invention may effectively automatically control the power supply to the car computer depending on the ON or OFF state of the car power.

What is claimed is:

1. A power control system for car computer, comprising:
   a computer host;
   a power switching circuit provided between a power input terminal of the computer host and an external power source; whereby when a key power is turned on and supplied to the computer host, the computer host outputs a keep-power-on signal;
   a power ON/OFF circuit provided between the power switching circuit and the external power source; the power ON/OFF circuit receiving the keep-power-on signal output by the computer host to thereby connect the external power source to the power input terminal of the computer host to form a close circuit;
   a key power detection circuit for detecting from time to time whether the key power is in the ON state, and outputting a detected result to the computer host, so that the computer host may output a shut-down signal when the key power is detected as OFF;
   a computer shut-down circuit for receiving the shut-down signal output by the computer host and thereby driving the computer host to execute shut-down procedures; and
   a power OFF circuit for sensing an OFF state of the key power, and outputting a control signal to drive the power ON/OFF circuit to disconnect the external power source from the computer host.

2. The power control system for car computer as claimed in claim 1, wherein the external power source is a car battery power source.

3. The power control system for car computer as claimed in claim 1, wherein the power switching circuit is located before the power input terminal of the computer host, and is forward connected to the key power via a first diode, and to the external power source via another diode parallelly connected to the first diode.

4. The power control system for car computer as claimed in claim 1, wherein the computer shut-down circuit includes a first transistor switch connected to a pin GPO1 and a power ON/OFF of the computer host as well as to a grounding capacitor, and the grounding capacitor is connected to the key power detection circuit via a resistor and a diode.

5. The power control system for car computer as claimed in claim 4, wherein the computer shut-down circuit further includes a second transistor switch connected between the power ON/OFF circuit and the computer host.

6. The power control system for car computer as claimed in claim 5, wherein the power OFF circuit includes a diode connected to the key power, the diode is connected via a resistor to a grounding capacitor and an inverter, and the inverter is connected via a transistor switch to the transistor switch of the power ON/OFF circuit and the second transistor switch of the computer shut-down circuit.

* * * * *